UNITED STATES PATENT OFFICE.

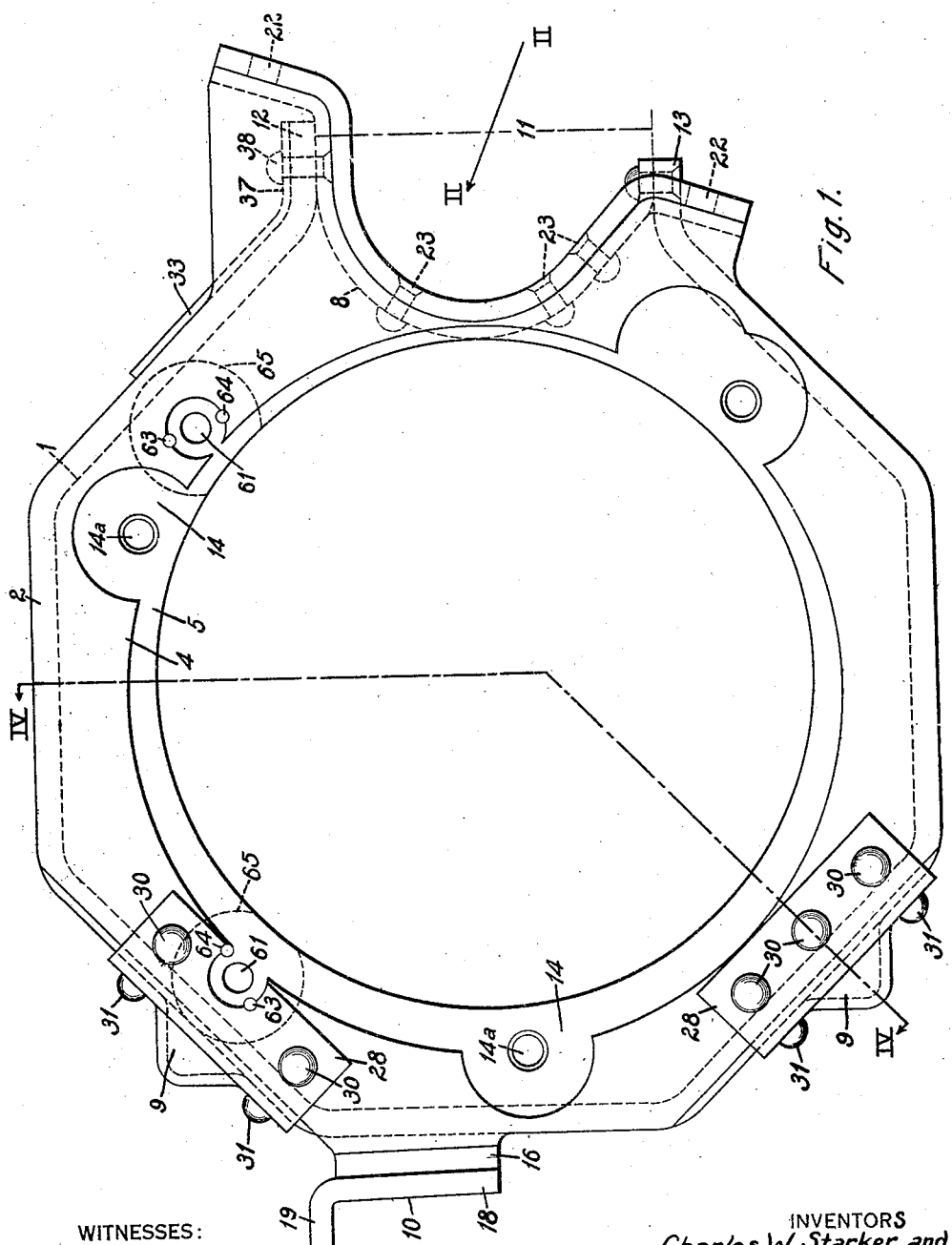

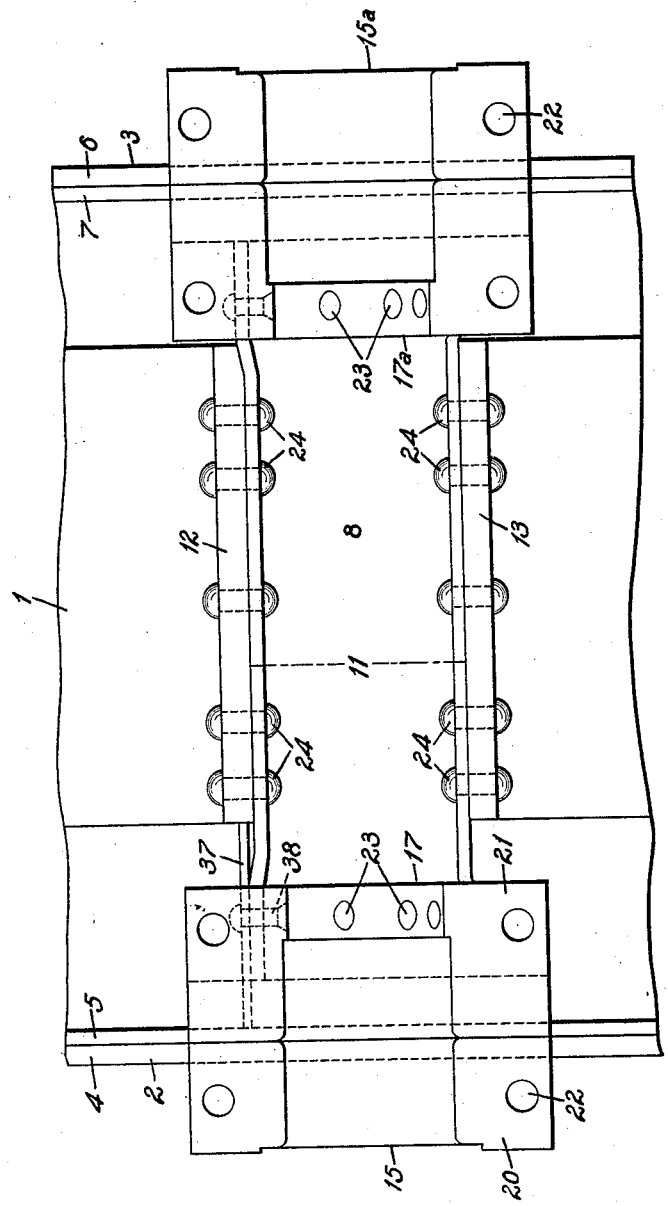

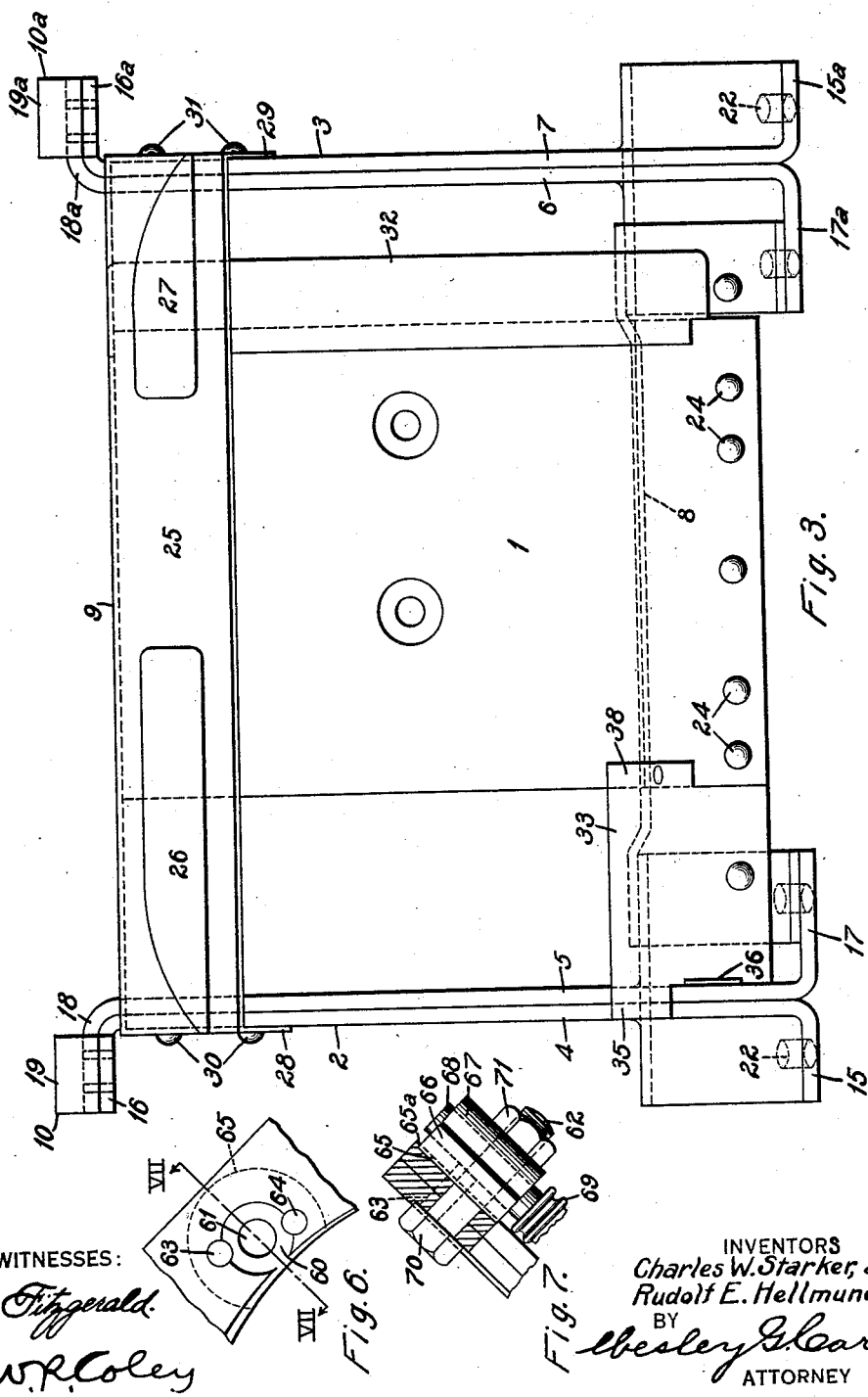

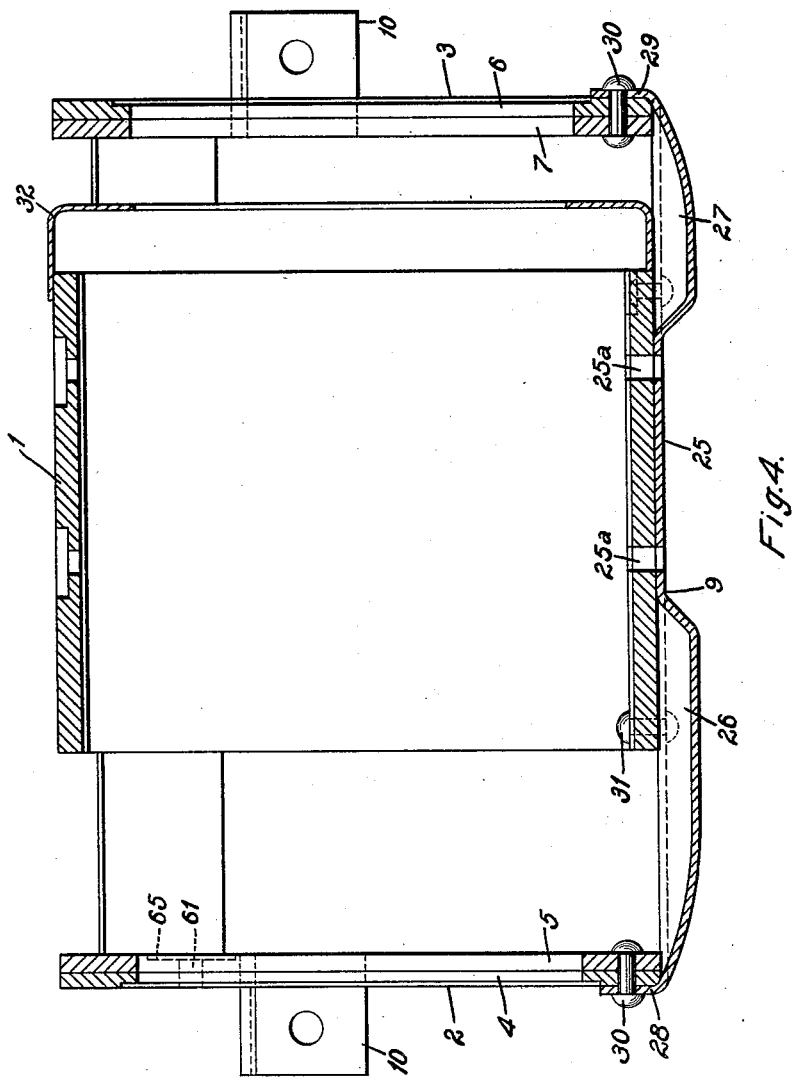

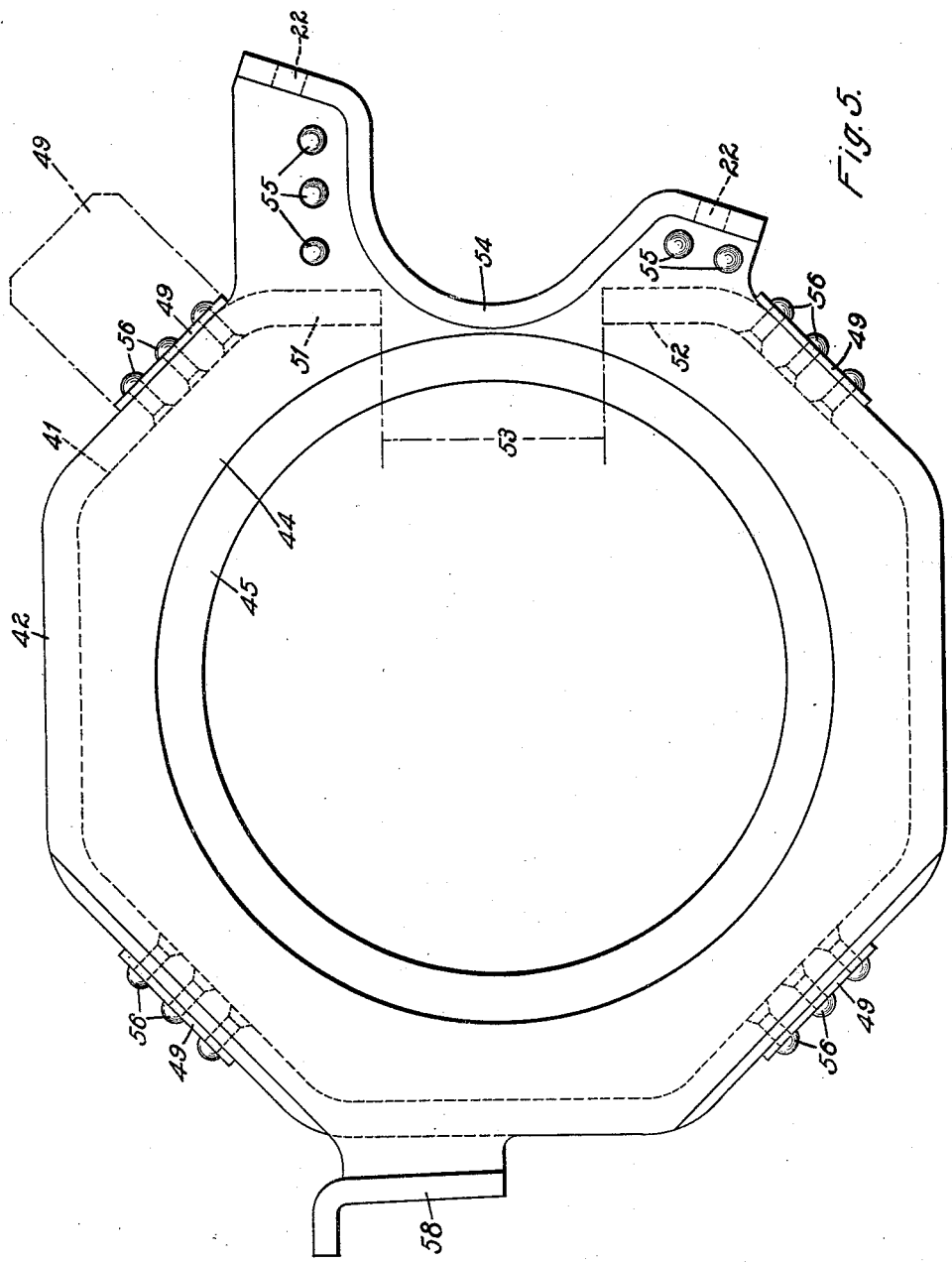

CHARLES W. STARKER, OF PITTSBURGH, AND RUDOLF E. HELLMUND, OF SWISSVALE, PENNSYLVANIA, ASSIGNORS TO WESTINGHOUSE ELECTRIC AND MANUFACTURING COMPANY, A CORPORATION OF PENNSYLVANIA.

FRAME FOR DYNAMO-ELECTRIC MACHINES.

1,306,563.  Specification of Letters Patent.  Patented June 10, 1919.

Application filed October 24, 1916. Serial No. 127,359.

*To all whom it may concern:*

Be it known that we, CHARLES W. STARKER, a subject of the Emperor of Germany, and a resident of Pittsburgh, in the county of Allegheny and State of Pennsylvania, and RUDOLF E. HELLMUND, a subject of the Emperor of Germany, and a resident of Swissvale, in the county of Allegheny and State of Pennsylvania, have invented a new and useful Improvement in Frames for Dynamo-Electric Machines, of which the following is a specification.

Our invention relates to dynamo-electric machines and especially to certain structural features of frames for electric-railway motors and the like.

One object of our invention is to provide a structure of the above-indicated character wherein the end rings that are customarily employed for supporting armature bearing-housings are fashioned in such manner that they are adapted to also form axle-bracket seats, thereby obviating, in part, the necessity for supplying separate axle-bracket supporting members.

More specifically stated, it is an object of our invention to provide a structure of the class in question wherein the strains arising between the armature and the truck axles shall be transmitted, for the most part, through integrally-related members, thereby partially eliminating the use of the rivets of the prior art.

Another object of our invention is to provide a dynamo-electric machine frame of the class in question which shall be relatively simple and inexpensive in construction and light in weight and which shall embody a minimum number of parts of simple form for securing the necessary electrical and mechanical characteristics, as set forth in detail later.

Our invention may best be understood by reference to the accompanying drawings wherein Figure 1 is a view, in end elevation, of a dynamo-electric machine frame constructed in accordance with out present invention; Fig. 2 is a fragmentary view, in elevation, looking along the line II—II of Fig. 1; Fig. 3 is a view, in side elevation, of the structure that is illustrated in Fig. 1; Fig. 4 is a longitudinal sectional view taken along the line IV—IV of Fig. 1; Fig. 5 is a view, in end elevation, corresponding to Fig. 1, of a modified form of our invention; and Fig. 6 and Fig. 7 are detail views showing the preferred location of brush-holding devices with respect to the machine frame.

Referring to the drawings, the structure shown comprises a main magnetizable yoke or band member 1, preferably of the customary polygonal shape; a plurality of double-membered end rings 2 and 3 which are spaced suitable distances apart from the main yoke member and respectively comprise plate members 4 and 5, and 6 and 7; an axle-bracket seat-connecting member 8 that is associated with the main yoke member 1 and the end-rings 2 and 3 in a manner to be described; a pair of connecting members or tie-pieces 9 for further mechanically connecting the component parts of the machine frame; and a pair of suspension lugs 10 and 10$^a$ that are integrally formed from the end rings 2 and 3, as subsequently set forth in detail.

The main yoke member 1 has a gap or opening 11 in one side that is provided with preferably parallel, outwardly-extending lips 12 and 13, to which the axle-bracket seat 8 is suitably secured by means of rivets 24, as best shown in Fig. 2.

The end-rings 2 and 3 are complementary in nature and, consequently, it is believed that a detailed description of the end-ring 2 will be sufficient for a thorough understanding of the end-ring construction. The end-ring 2 is located at the "commutator end" of the motor frame while the other end-ring 3 corresponds to the "pinion end" thereof.

The outer plate member 4 of the end-ring 2 has a counterbored central opening of slightly larger diameter than the true central opening of the plate members (see Fig. 4) and is also provided with a plurality of spaced counterbored recesses 14 which surround bolt holes 14$^a$ in the two plate members. The purpose of such construction is to suitably provide for the reception and support of armature bearing housings (not shown) which may be of any suitable type and will be secured to the end-rings through the agency of bolts that extend through the openings 14ª.

One portion of the outer plate member 4 is bent or flanged to extend longitudinally outwardly and is pressed into a substantially semi-cylindrical member or seat 15 for the purpose of aiding in the reception and support of suitable axle-brackets (not shown). Another portion 16 of the outer plate member 4 that is located substantially opposite to the axle-bracket seat member 15 is also bent longitudinally outwardly to form a portion of the suspension lug 10.

The inner plate member 5 has a portion 17 that corresponds to the axle-bracket seat portion 15 of the outer plate member 4, fashioned in a similar manner but extending in the opposite direction; that is, toward the main yoke member 1, so that the portions 15 and 17 of the end ring 2 together form a continuous axle-bracket seat of suitable length.

On the opposite side of the end-ring 2, the inner plate member 5 has a portion 18 bent longitudinally outwardly to closely fit around the portion 16 of the outer plate member 4, and a tab or wing 19 is bent in a transverse direction, whereby the complete suspension lug 10 comprises portions 16, 18 and 19 which are all integral with the end-ring 2, considered as a unitary member. Corresponding members 16ª, 18ª and 19ª are formed for the other end-ring 3 to thus provide the other necessary suspension lug 10ª, which, together with the lug 10, is adapted to effectively perform the intended function of supporting the motor upon a truck frame (not shown), in accordance with customary practice.

The axle-bracket seat members 15 and 17 severally comprise a substantially semi-cylindrical intermediate portion and flat transversely-extending side members 20 and 21, respectively, which are alined and are provided with suitable bolt-holes 22 for the purpose of mechanical connection to the customary axle-cap (not shown) through the agency of suitable bolts, as is usual practice.

The outer and inner plate members 6 and 7, respectively, of the other end-ring 3 are provided with axle-bracket seat members 15ª and 17ª that respectively correspond to the above-described members 15 and 17 and are suitably alined therewith to collectively form an axle-bracket seat or supporting member which is made continuous by the intermediate location of the axle-bracket seat-connecting member 8, as about to be described in detail.

One advantage of the end-ring construction just described is the obviation of heavy strains between end-rings and axle-brackets, by reason of the partial elimination of riveted parts from the prior-art structures, as will be understood. Such strains arise during the transmission of energy from the armature shaft to the truck axle through a meshing pinion and gear, or the like, in accordance with customary practice.

The intermediate connecting-member 8 is of approximately semi-cylindrical form and is secured, near its respective longitudinal edges, to the lip members 12 and 13 of the main yoke member 1 through the agency of rivets 24, as previously mentioned. The member 8 is of a length greater than the width of the main yoke member 1 and is secured, near its ends, to the adjacent seat members 17 and 17ª of the inner plate members 5 and 7, respectively, by means of suitable rivets 23. Thus, in effect, a unitary axle-bracket-seat member, comprising the portions 15 and 17 of the end-ring 2 and the portions 15ª and 17ª of the end-ring 3, together with the intermediate connecting member 8, is formed. It will be appreciated that, although the structure just described is materially light in weight and formed of relatively few parts, the requisite strength and rigidity is provided.

Furthermore, the length of the cylindrical central portion of the axle-bracket-connecting member 8 is such as to permit of the use of a wider yoke member than that shown, whereby the available magnetic material may be readily increased to thus vary the electrical characteristics of the machine, as more fully set forth in a copending application of C. W. Starker, Serial No. 860,974, filed September 10, 1914. It will be understood that the connecting member 8 also serves the purpose of suitably conducting the machine field flux across the gap 11, thereby magnetically, as well as mechanically, completing the main frame periphery.

The connecting members or tie-pieces 9 severally comprise specially-shaped bar members, preferably of pressed-steel that provide a maximum of resistance to deformation with a minimum of weight. The intermediate portion 25 of each tie-piece 9 is substantially flat and rests upon the main yoke member 1 to which each tie-piece may be secured in any suitable manner, as by bolts (not shown) that extend through bolt-holes 25ª for the purpose of supporting the field-magnet polar projections (not shown), as is customary, and the end portions of the tie-piece are provided with pressed-out ribs or bosses 26 and 27 and bent-over tabs or ears 28 and 29 that are mechanically secured to the end rings 2 and 3 through the agency of suitable rivets 30. Other rivets 31 are employed to further secure the tie-pieces to the yoke member 1, such rivets being suitably located alongside the bosses or ribs 26 and 27.

Moreover, the tie-pieces 9 are placed in such locations as to assist in carrying the field flux of the machine to the end-rings, that is, the tie-pieces are located in substantial alinement with certain main polar projections (not shown) which, in accordance with customary practice, are secured within the machine frame at the "45° points" thereof, or diagonally. By thus employing the tie-pieces and end-rings as portions of the machine magnetic circuit, of course the size and weight of the yoke member 1 may be correspondingly reduced.

Since many modern railway motors embody fan structures rotatable with the armatures for providing effective ventilation of the motor parts, some special form of stationary diaphragm or partition is often required in connection with the fan to properly direct the stream of ventilating air, as will be understood. In the present instance, a shallow cup-shaped member 32 is located in the space between the main yoke member 1 and the end-ring 3, that is, near the "pinion end" of the frame, for the purpose just recited. The ring 32 is preferably spot-welded to the main yoke member 1. However, it will be appreciated that any other suitable means for accomplishing the intended function may be employed.

To further brace the frame member parts near the axle-bracket seats and also to increase the magnetic-circuit section at that point, a plate 33 is suitably bent to closely fit the outer surface of the lip 12 of the main yoke member and the adjacent upwardly-inclined surface thereof, and is provided with a tab or ear 37 that is secured to the main yoke member by a suitable rivet 38. Another tab member 35 is bent over an adjacent portion of the periphery of the end-ring 2 and may be spot-welded or otherwise suitably secured thereto. Still another tab or ear 36 is bent in another transverse direction and is secured to the end-ring 2 by means of spot-welding or the equivalent. Thus a compact bracing member of relatively small dimensions is secured to the yoke member 1 and the end-ring 2 in a position that does not, in any way, interfere with desirable space requirements with respect to inspecting the commutator and brushes or otherwise working upon the corresponding end of the motor armature or frame, such as replacing brushes, etc.

For removably closing the spaces between the main yoke-member and the respective end-rings, thereby excluding dust, etc., from the machine interior, sheet-steel or other suitable covers may be employed: for example, an appropriately-secured "commutator cover" (not shown) may be fashioned to close the space between the plate 33 and the upper tie-piece 9.

It will be appreciated that various modifications, or omissions of certain parts, of the previously-described structure may be made within the spirit and scope of our invention. For example, either the inner or the outer plate members of the end-rings may be omitted, in some cases, to provide a single integral axle-bracket seat member near each end of the machine frame to which the interconnecting piece 8 may be suitably secured. Furthermore, the lips 12 and 13 of the main yoke member 1 may be related in other ways than the horizontal, parallel arrangement that is illustrated, as indicated, for instance, in Fig. 5, to be described.

Referring to Fig. 6, which is an enlarged view of a portion of the upper right-hand sector of the end-ring 2, and to Fig. 7, which is a sectional view taken on the line VII—VII of Fig. 6, together with a portion of a brush-holding device, the structure shown comprises a counterbored recess 60 in the outer plate 4 through which a central opening 61 extends to permit the passage of a suitable bolt, or the like, 62.

A plurality of dowel-pins 63 and 64, or other suitable positioning members, are rigidly located in the end-ring 2, projecting a short distance beyond the inner face of the end-ring and lying substantially flush with the outer face thereof.

A counterbored or circular seat or depression 65 is located, substantially concentrically with respect to the bolt-receiving opening 61, on the inner face of the end-ring 2, while a corresponding boss or circular raised portion 65ª is machined upon a block member 66 of familiar design and is adapted to fit within the seat 65, thereby providing an exact and ready means for suitably locating a brush-holding device.

A complementary block member 67 is located in alinement with the other block member 66, and the two block members are severally provided with one or more semi-circular grooves of well-known form, for suitably inclosing the arms or pins 68 of a brush-holding device 69 of any suitable construction for properly positioning brushes with respect to the commutator cylinder of the armature (not shown), as will be understood.

The bolt 62 is shown as provided with a suitable head 71 that is located outside the end-ring 2 and with a nut 70 that is threaded upon the other end of the bolt to securely position the block members 66 and 67 against the inner face of the end-ring 2 and thus properly grip the arms 68 of the brush-holder.

The inner ends of the dowel pins 63 and 64 are adapted to rest within corresponding recesses in the adjacent face of the block member 66, thereby effectively preventing rotative movement of the block 66 and, consequently, of the brush holding device as a whole, around the bolt 62, under service conditions.

It will be understood, without further description, that a brush-holding device of the type just described is similarly secured to a corresponding point in the upper left-hand sector of the end-ring 2, as indicated by the dotted depression 65 and the dowel pins 63 and 64 in that portion of the end-ring.

In all prior-art dynamo-electric machines of the class under consideration, of which I have knowledge, the brush-holding devices were secured to a convenient portion of the side-walls of the machine frame, or an equivalent arrangement was employed, as will be understood by those skilled in the art, without further discussion. In the present instance, however, the location of the brush-holding-device blocks is at right angles to the formerly employed position thereof and, consequently, the brush-holding box will be correspondingly re-located with respect to the arms or pins 68.

Referring to the modified structure that is shown in Fig. 5, a main yoke member 41 that corresponds to the previously-described yoke member 1, is provided together with a double end-ring 42 that comprises an outer suitably counterbored plate 44 and an inner plate 45.

The yoke member 41 is provided, at one side, with oppositely located alined portions 51 and 52 which have a gap or opening 53 between them that corresponds to the gap 11 that is shown in Fig. 1.

The outer plate member 44 has one portion bent longitudinally outwardly and fashioned into a substantially semi-cylindrical axle-bracket seat member 54, while a portion 58 of the outer plate member that is located on the opposite side of the machine frame is suitably bent, in substantially the same manner as the previously-described members 18 and 18ᵃ, to form a suspension bar. Since the general principles of construction of the frame that is illustrated in Fig. 5 are quite similar to those previously set forth, it is not believed that a complete illustration or description of the frame is necessary. It will be understood that the inner plate member 45 is provided with an axle-bracket-seat member that is similarly shaped to the member 54 of the outer plate 44, whereby an axle-bracket seat corresponding to the hereinbefore-described portions 15 and 17 is provided. Furthermore, the end-ring that is located on the opposite end of the motor frame will be analogously fashioned, thereby corresponding to the previously-mentioned end-ring 3.

For securing the end-ring plate members 44 and 45 together near the axle-bracket seat portion, a plurality of rivets 55 may be provided, if desired, whereas, for the purpose of securing the end-ring 42 to the main yoke member 41, a plurality of tabs or wings 49 of the shape indicated by the dotted line in the upper-right-hand portion of the figure and integrally related to the outer plate member 44, are provided. The tab or wing members 49 are bent at right angles to overlap the main yoke member 41, to which they are secured by means of a plurality of rivets 56. In this way, when the relatively great mechanical strength that is provided by the previously-described tie-pieces 9 is not necessary, the present construction, which is less expensive and more easily assembled, may be employed.

We do not wish to be restricted to the structural details or arrangement of parts herein shown, as various other modifications thereof may be effected without departing from the spirit and scope of our invention. We desire, therefore, that only such modifications shall be imposed as are indicated in the appended claims.

We claim as our invention:

1. In a railway motor, a box frame embodying an end-ring having an integral portion shaped to form a substantially semi-cylindrical axle-bracket seat.

2. A dynamo-electric machine frame embodying a double-membered end-ring having portions of its respective members similarly shaped and extending in opposite directions to form an axle-bracket seat.

3. A dynamo-electric machine frame embodying a double-membered end-ring having portions of its respective members similarly shaped and extending in opposite directions to form an axle-bracket seat on one side of the frame and having other portions bent to collectively form a suspension bar on the opposite side of the frame.

4. A dynamo-electric machine frame embodying an end-ring having a portion shaped to form an axle-bracket seat on one side of the frame and having another portion bent to form a suspension bar on the opposite side of the frame.

5. A dynamo-electric machine frame embodying a main yoke member, an end-ring having a portion shaped to form a semi-cylindrical axle-bracket seat, and a connecting member secured to said seat and said yoke member.

6. A dynamo-electric machine frame embodying a main yoke member, a pair of end-rings having portions shaped to form alined axle-bracket seats, and a connecting member secured to said yoke member and both of said seats.

7. A dynamo-electric machine frame embodying a yoke member, a pair of end-rings having portions shaped to form alined axle-bracket seats, and a connecting member bridging said gap and secured to both of said seats.

8. A dynamo-electric machine frame embodying a yoke member, a pair of double-membered end-rings severally having portions of their respective members similarly shaped and extending in opposite directions to collectively form alined axle-bracket seats, and a connecting member secured to said yoke member and to the adjacent inner parts of said seats.

9. A dynamo-electric machine frame embodying a yoke member, a pair of double-plate end-rings severally having portions of their respective plates similarly shaped and extending in opposite directions to collectively form alined axle-bracket seats and a connecting member bridging said gap and secured to the adjacent inner parts of said seats.

10. A dynamo-electric machine frame comprising a yoke member, a pair of end-rings having portions shaped to form alined semi-cylindrical axle-bracket seats, a connecting-member secured to said yoke member and both of said seats, and a plurality of tie-pieces spaced from the seats and from each other and secured to the yoke member and the end rings.

11. A dynamo-electric machine frame comprising a yoke member, a pair of double-plate end-rings severally having portions of their respective plates similarly shaped and extending in opposite directions to collectively form alined axle-bracket seats, a connecting member bridging said gap and secured to the adjacent inner parts of said seats, and a plurality of tie-pieces spaced from the seats and from each other and secured to the yoke member and the end rings.

12. A dynamo-electric machine frame comprising a main yoke member, an end-ring having a portion shaped to form an axle-bracket seat and also having tab members secured to said yoke member.

13. A dynamo-electric machine frame comprising a main yoke member, a pair of end-rings having portions shaped to form alined axle-bracket seats, and a connecting member secured to said yoke member and both of said seats, said end-rings, having a plurality of tab members bent over and secured to said yoke member.

14. A dynamo-electric machine frame comprising a main yoke member having a gap in one side, a pair of double-plate end-rings severally having portions of their respective plates similarly shaped and extending in opposite directions to collectively form alined axle-bracket seats, and a connecting member bridging said gap and secured to the adjacent inner parts of said seats, the outer plate members having tab members bent over and secured to said yoke member.

In testimony whereof, we have hereunto subscribed our names this 19th day of Oct., 1916.

CHARLES W. STARKER.
RUDOLPH E. HELLMUND.

Copies of this patent may be obtained for five cents each, by addressing the "Commissioner of Patents, Washington, D. C."